(12) United States Patent
Bjorkengren (10) Patent No.: US 9,811,312 B2
(45) Date of Patent: Nov. 7, 2017

(54) CONNECTED DEVICE VOICE COMMAND SUPPORT

(71) Applicant: Intel Corporation, Santa Clara, CA (US)

(72) Inventor: Ulf Bjorkengren, Bjärred (SE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/579,142

(22) Filed: Dec. 22, 2014

(65) Prior Publication Data

US 2016/0179462 A1    Jun. 23, 2016

(51) Int. Cl.
*G10L 15/00* (2013.01)
*G10L 15/26* (2006.01)
*G10L 21/00* (2013.01)
*G10L 25/00* (2013.01)
*G06F 3/16* (2006.01)
*G10L 15/22* (2006.01)

(52) U.S. Cl.
CPC .............. *G06F 3/167* (2013.01); *G10L 15/22* (2013.01); *G10L 2015/223* (2013.01)

(58) Field of Classification Search
USPC .......................................... 704/235, 270–275
See application file for complete search history.

(56) References Cited

U.S. PATENT DOCUMENTS

| | | | | |
|---|---|---|---|---|
| 6,397,186 B1* | 5/2002 | Bush | ..................... | G10L 15/26 704/272 |
| 6,615,177 B1* | 9/2003 | Rapp | ..................... | G10L 15/26 704/270 |
| 6,654,720 B1* | 11/2003 | Graham | ..................... | G06F 3/16 704/270 |
| 6,842,510 B2* | 1/2005 | Sakamoto | ............... | G10L 17/00 379/102.01 |
| 7,003,463 B1* | 2/2006 | Maes | ................. | H04L 29/06027 704/231 |
| 8,963,694 B2* | 2/2015 | Nystrom | ............ | H04N 21/4131 340/10.1 |
| 9,110,635 B2* | 8/2015 | Knox | ...................... | G06F 3/017 |
| 2002/0069063 A1* | 6/2002 | Buchner | ............. | H04L 12/2803 704/270 |
| 2002/0082835 A1* | 6/2002 | Squibbs | .................. | G06F 3/011 704/270 |
| 2002/0082836 A1* | 6/2002 | Squibbs | .................. | G06F 3/011 704/270 |
| 2002/0193989 A1* | 12/2002 | Geilhufe | ................. | G10L 15/26 704/208 |

(Continued)

OTHER PUBLICATIONS

"International Application Serial No. PCT/US2015/062358, International Search Report dated Feb. 26, 2016", 7 pgs.

(Continued)

*Primary Examiner* — Olujimi Adesanya (74) *Attorney, Agent, or Firm* — Schwegman Lundberg & Woessner, P.A.

(57) ABSTRACT

Systems and techniques for connected device voice command support are described herein. A voice command may be received from a user. A set of connected devices proximate to the user may be identified. The voice command may be transformed into a command for the set of connected devices. The command may be communicated to the set of connected devices.

18 Claims, 4 Drawing Sheets

(56) References Cited

U.S. PATENT DOCUMENTS

| | | | |
|---|---|---|---|
| 2004/0002866 A1* | 1/2004 | Deisher | G10L 15/30 704/275 |
| 2004/0102977 A1* | 5/2004 | Metzler | G10L 15/22 704/275 |
| 2005/0096753 A1 | 5/2005 | Arling et al. | |
| 2005/0114141 A1* | 5/2005 | Grody | G10L 15/30 704/270 |
| 2006/0176188 A1* | 8/2006 | Cho | G08C 17/02 340/12.23 |
| 2007/0298405 A1 | 12/2007 | Ebrom et al. | |
| 2008/0034081 A1* | 2/2008 | Marshall | G08C 17/02 709/223 |
| 2009/0116691 A1* | 5/2009 | Scholl | G08C 17/00 382/103 |
| 2009/0160694 A1 | 6/2009 | Di Flora | |
| 2011/0138285 A1* | 6/2011 | Kuo | G06F 3/017 715/727 |
| 2012/0021684 A1 | 1/2012 | Schultz et al. | |
| 2012/0154195 A1* | 6/2012 | Nystrom | H04N 21/4131 341/176 |
| 2013/0073293 A1* | 3/2013 | Jang | G10L 15/22 704/275 |
| 2013/0339027 A1* | 12/2013 | Dokor | G06F 17/20 704/275 |
| 2014/0005809 A1* | 1/2014 | Frei | H04L 29/1249 700/90 |
| 2014/0244834 A1 | 8/2014 | Guedalia et al. | |
| 2015/0006184 A1* | 1/2015 | Marti | G10L 15/28 704/275 |
| 2015/0154001 A1* | 6/2015 | Knox | G06F 3/017 345/156 |
| 2015/0154976 A1* | 6/2015 | Mutagi | H04L 12/281 704/275 |
| 2015/0162006 A1* | 6/2015 | Kummer | G05B 11/01 704/275 |
| 2015/0277574 A1* | 10/2015 | Jain | G06F 3/017 345/156 |
| 2015/0346701 A1* | 12/2015 | Gordon | G05B 15/02 700/275 |
| 2016/0075034 A1* | 3/2016 | Laurent | H04L 12/282 700/264 |

OTHER PUBLICATIONS

"International Application Serial No. PCT/US2015/062358, Written Opinion dated Feb. 26, 2016", 7 pgs.

* cited by examiner

CONNECTED DEVICE VOICE COMMAND SUPPORT

TECHNICAL FIELD

Embodiments described herein generally relate to device control interfaces and more specifically to voice command support for connected devices.

BACKGROUND

Household devices (e.g., appliances, entertainment systems, etc.) are more commonly bestowed processing capabilities than in the past. For example, a refrigerator may include the ability to analyze its contents and inform a user when, for example, more milk should be purchased. Aspects of these additional processing capabilities may include network connectivity and expanded user interfaces. With respected to the network connectivity, such devices are connected devices. When these devices are able to participate on the Internet, the collection of these devices may be known as the Internet of Things (IoT). With respect to user interfaces, richer interfaces are more commonly available than the traditional interfaces for these devices. For example, a light may have been actuated by one or more switches whereas additional processing capabilities of some lights permit the light to be controlled by remote device, mobile device application, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A feature present in many of these connected devices is the lack of physical user interfaces that provide a rich user experience. For example, it may be impractical to install a touch screen or screen and keypad on every refrigerator, light, thermostat, radio, television, etc. Moreover, even if practical, it may be expensive to add such physical interfaces for what may be considered ancillary functions of the connected device. An alternative may be voice-based user interfaces. Such interfaces generally only use a microphone as a physical interface to the connected device. However, processing audible data for voice commands may not be power efficient (which is often a concern for connected devices) or simply add too much processing hardware to the connected device to meet manufacturing goals (e.g., price, packaging size, etc.) for the device.

A solution to the problems noted above is to remove the voice command processing from the connected device itself and bring it to a user device, such as a mobile phone, a tablet, computer, etc. The user device may interpret the voice command into a command that works for the connected devices and communicate the direct connected device command to the connected devices. In an example, the voice command may actually be received at the connected device, relayed to the user device where the processing occurs, and then sent the correct machine format command from the user device.

The mechanism of voice command support described herein differs from other voice command services in that the present mechanism does not rely on tight coupling between a given device and the audio environment in which the command is spoken. For example, in a car-based voice system, the system generally assumes that any utterance is directed towards itself. In contrast, in a connected device ecosystem with voice processing by the user device, the user device is tasked with both interpreting the command and identifying connected devices to which the command should apply.

To facilitate the identification of connected devices to which the command should apply, the user device may employ a discovery process to determine which devices are relevant or even available. This discovery process may be directed (e.g., with input from the user) or filtered based on known data about either the command or connected devices that are communicatively coupled to the user device. In any case, the presently described techniques provide a robust user interface to connected devices without burdening those devices with excessive processing hardware. Further, the described techniques operate in a dynamic environment in which the specific connected devices controllable by the user may change over time.

Figure 1:
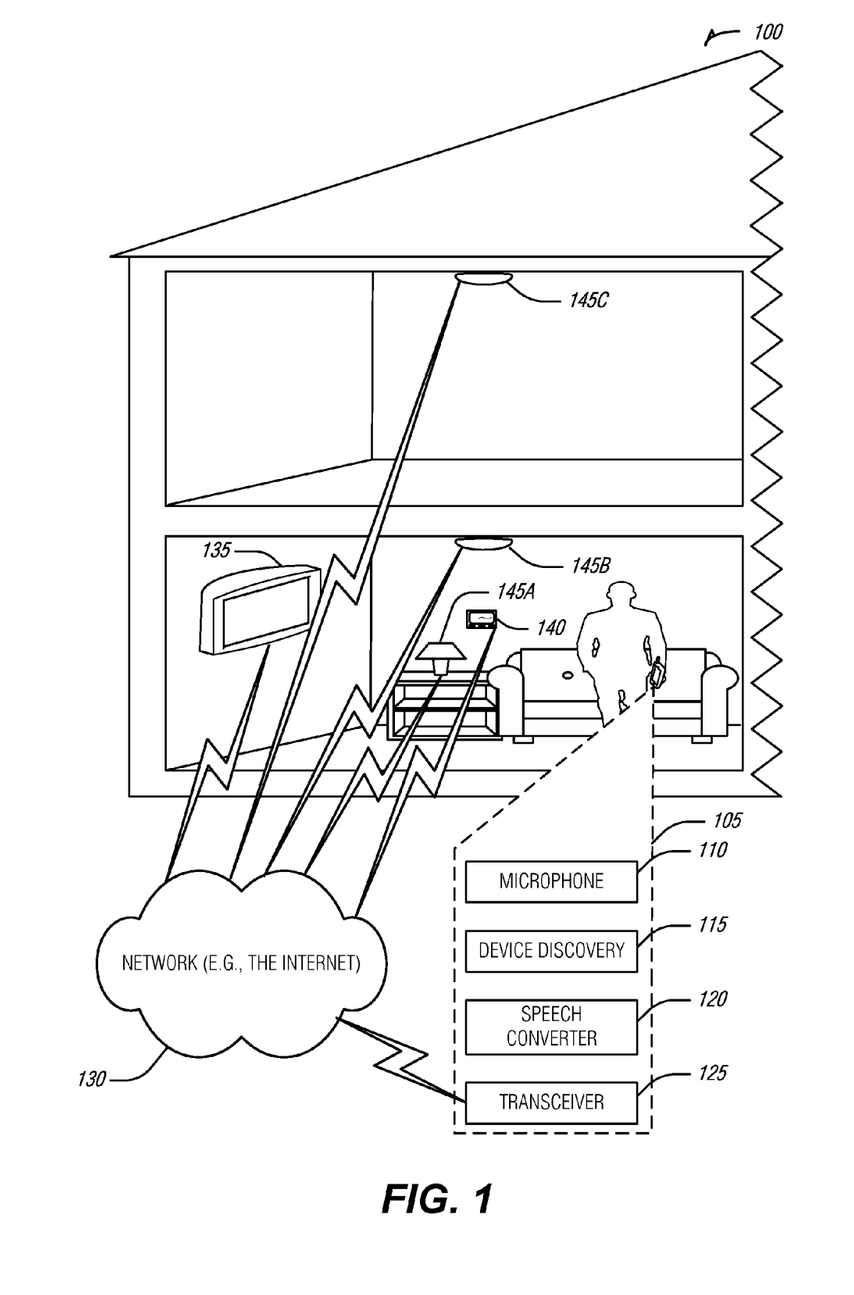
FIG. 1 is a block diagram of an example of a system for connected device voice command support, according to an embodiment.

FIG. 1 is a block diagram of an example of a system 100 for connected device voice command support, according to an embodiment. The system 100 may include a device 105 (e.g., a user device, mobile device, tablet, computer, etc.) a set of connected devices proximate to the user such as a television 135, a thermostat 140, or lighting devices 145A-C, which are communicatively coupled in operation by a network 130. As used herein a proximate user device is within a predefined distance of the user or within range of a close range wireless technique to the device 105. Predefined distances for proximity may vary based on the connected device type. For example, being proximate to the television 135 may be defined as within the same room as the television 135 whereas being proximate to the thermostat 140 may be defined as within the same building structure as the thermostat 140.

The device 105 may include a microphone 110, a device discovery circuit set 115, a speech converter 120, and a transceiver 125. The microphone 110 may be arranged (e.g., configured, constructed, etc.) to receive a voice command from the user. In an example, the microphone is located on a connected device instead of, or in addition to, the device 105. In an example, the voice command may include a connected device characterization. Connected device characterizations are labels applied to either connected device or to functions of detected devices that are not specific to the device, but rather to an understanding of the device or command. For example, the television 135 may be manufactured with a name (e.g., "Model NG-543D"). A predefined characterization for the television 135 may include "TV" or "Television" to reflect the class or type of device that it is. Further, the user may define other characterizations for the television 135, such as "living room TV." Characterizations may be provided for connected device functions. For example, a characterization of "brighter" may apply to the function "increase lumen output" for the light 145A and the function "enhance light" for the light 145B. Such characterization both permit user customization as well as facilitate ultimate connected device control by normalizing device characteristics to which the voice command is applied.

The device discovery circuit set 115 may be arranged to identify a set of connected devices proximate to the user. In an example, to identify the set of connected devices may include the device discovery circuit set 115 to request connected device information using a close range wireless technique. Example, close range wireless techniques may include radio frequency (e.g., near field communications (NFC), Bluetooth®, WiFi®, Radio Frequency Identification (RFID), etc.), magnetic (e.g., near field magnetic resonance communication (NFMRC)), sound (e.g., ultrasonic), or light (e.g., infrared (IR) communications) based techniques. In an example, to identify the set of connected devices may include the device discovery circuit set 115 to monitor for connected device broadcasts. Thus, instead of, or in addition to, actively "pinging" the connected devices, the device 105 may passively listen for connected devices broadcasts to determine whether those connected devices are available for command.

In an example, to identify the set of connected devices may include the device discovery circuit set 115 to obtain geophysical positioning data on a superset of connected devices and the device 105. The device discovery circuit set 115 may then be arranged to select connected devices from the superset to be members of the set of connected devices for connected devices within a geo-fence—using the obtained positing data of the superset of connected devices—that includes the device 105. Such geo-fencing generally defines a shape (e.g., in two or three dimensions) which is positioned in relation to at least a point (e.g., a geo-position of the device 105). The device 105 geo-position may be determined using local location techniques (e.g., wireless local area network (WLAN) access point (AP) based techniques) or global location techniques (e.g., the global positioning system (GPS)). For example, a geo-fence may be defined a three dimensional volume of a room that the device 105 is within. In this example, the television 135, the thermostat 140, and lights 145A and 145B are within the geo-fence (and thus would be members of the set of connected devices) whereas the light 145C is outside of the geo-fence (and thus would not be selected for the set of connected devices although it would be in the superset of connected devices).

In an example, to identify the set of connected devices may include the device discovery circuit set 115 arranged to receive a discovery request from the user. In an example, such a request may include a voice command (e.g., "what devices are available to command"), an element actuation (e.g., pressing a button or clicking on a user interface element), or opening an application for controlling the connected devices. The device discovery circuit set 115 may be arranged to broadcast a discovery message in response to the request from the user and receive device identifications for a group of connected devices in response to the discovery request. In an example, once the device identifications are received, the device discovery circuit set 115 may be arranged to present the device identifications for the group of connected devices to the user (e.g., via a user interface on the device 105) and add members from the group of connected devices to the set of connected devices in response to user selections made in response to the presentation. Thus, if, for example, the discovery identified the three lights 145A, 145B, and 145C, the user may be presented with a list of these connected devices, and choose the light 145A.

In an example, one of the connected devices may operate as a device registry (e.g., a hub). The device registry may communicate with the other connected devices and maintain some information about these connected devices, such as identifiers, respective command sets, device types, current status (e.g., powered on/off, available, etc.). In an example, the device registry may maintain a data structure of user characterizations of the connected devices. Thus, the data structure may include a map of "bedroom light" to a different identifier to which the light 145C is addressable (e.g., to which it responds, etc.). In an example, the broadcast message described above is at least partially directed to and satisfied by the connected device registry. In an example, the device identifications are derived from a user defined translation of the device characterization. As described above, the characterization may be maintained by the connected device registry. In an example, the characterization may be also or alternatively be stored in the device 105 or in individual connected devices.

In an example, to identify the set of connected devices includes the device discovery circuit set 115 may be arranged to filter a superset of connected devices using the connected device characterization. For example, the voice command may include the characterization "illumination." Thus, even though the thermostat 140 is proximate to the user and available, it may be filtered out because it is not characterized by the term "illumination." As described above, the characterization may be of a connected device type, such as "audio" for the television 135 or a radio, or "environmental" for the thermostat 140 or lights 145A-C. in an example, the characterization may be of a connected device function. For example, the characterization "volume" may be applied to any connected device that has a volume control. Further, the characterization "on" may apply to any device that may be turned on (e.g., may not be applied to the thermostat 140 which is always on) and may also normalize the command (e.g., "on" for "power" or other commands having the same meaning).

The speech converter 120 may be arranged to transform the voice command into a command for the set of connected devices. In an example, to transform the voice command into the command may include the speech converter 120 to transmit the voice command to an external device and receive the command from the external device. In this example, the speech converter 120 may make use of external resources, such as cloud based voice recognition processing. In an example, the speech converter 120 may processing the voice command itself, but use an external service to translate the processed voice from an intermediate form to the device specific form of the command. In an example, to transform the voice command into a command for the set of connected devices may include the speech converter 120 to transform the voice command into a semantic representation of the voice command. This is an intermediate form that may be useful for translation of the voice command into a possible myriad of individual connected device protocols or commands. Further, as the semantic definition of the voice command is less likely to change over time, it may provide a stable model to which voice recognition is directed and also from which connected device commands are derived.

The transceiver 125 may be arranged to communicate the command to the set of connected devices. In an example, to communicate the command to the set of connected devices may include the transceiver 125 (or other component of the device 105) to transmit the command to the set of connected devices. In an example, the transmission may be limited to those connected devices to which the command applies. For example, if the voice command is a power-up command and the thermostat 140 does not have such a command, the command may not be sent to the thermostat 140. In an example, the transceiver 125 may be arranged to receive responses to the transmission of the command to the connected devices. The responses may be from a subset of the connected devices and may indicate that the command matches a supported command of the subset of connected devices. Thus, the power-up command may be sent to all of the television 135, the thermostat 140, and the lights 145A-C. The thermostat 140 does not respond because it does not having a matching power-up command. Thus, the subset of connected devices (e.g., the television 135 and the lights 145A-C) is defined by those connected device that respond to the command. In an example, in response to identifying the subset of the connected devices, the transceiver 125 may respond to the subset of connected devices to instruct them to carry out the command. This example allows the device 105 to explicitly identify and instruct those connected devices that will carry out the command. This may provide control over situations such as power-ing off the television 135 in response to a power-off command when only the lights 145A-B were intended.

In an example, to respond to the subset of connected devices may include the transceiver 125 arranged to identify conflicts between a plurality of the subset of connected devices based on the command. Using the example above, all of the television 135 and lights 145A-C may respond to a power-off command. This situation may be considered a conflict—as opposed to a single respondent where an inference that it is the intended respondent may be made—to which a resolution procedure may be applied. In an example, the resolution procedure may include the transceiver 125 to present the conflicts to the user. Example presentations may include a graphical user interface in which the conflicted device are presented and allowing the user to select the device or devices to which the command should be applied. The presentation may similarly include voice, or other mechanisms (e.g., a haptic vibration to indicate the conflict and an input mechanism whereby the user points the device 105 at the desired connected device) to allow the user to resolve the conflict. The transceiver 125 may be arranged to restrict the command carry out response to the connected device selected by the user in response to the presentation of the conflicts. In an example, the device specific connected devices to which the command applies may be selected by the user waving a hand over/at, looking at (e.g., gaze tracking), or otherwise physically identifying the specific connected devices. Such interactions may be captured by the device 105, or the connected devices themselves. In an example, the class of connected devices may be selected by physically indicating one in the class. For example, the user may look at a light of a set of lights, and the command may be applied to the entire set.

Figure 2:
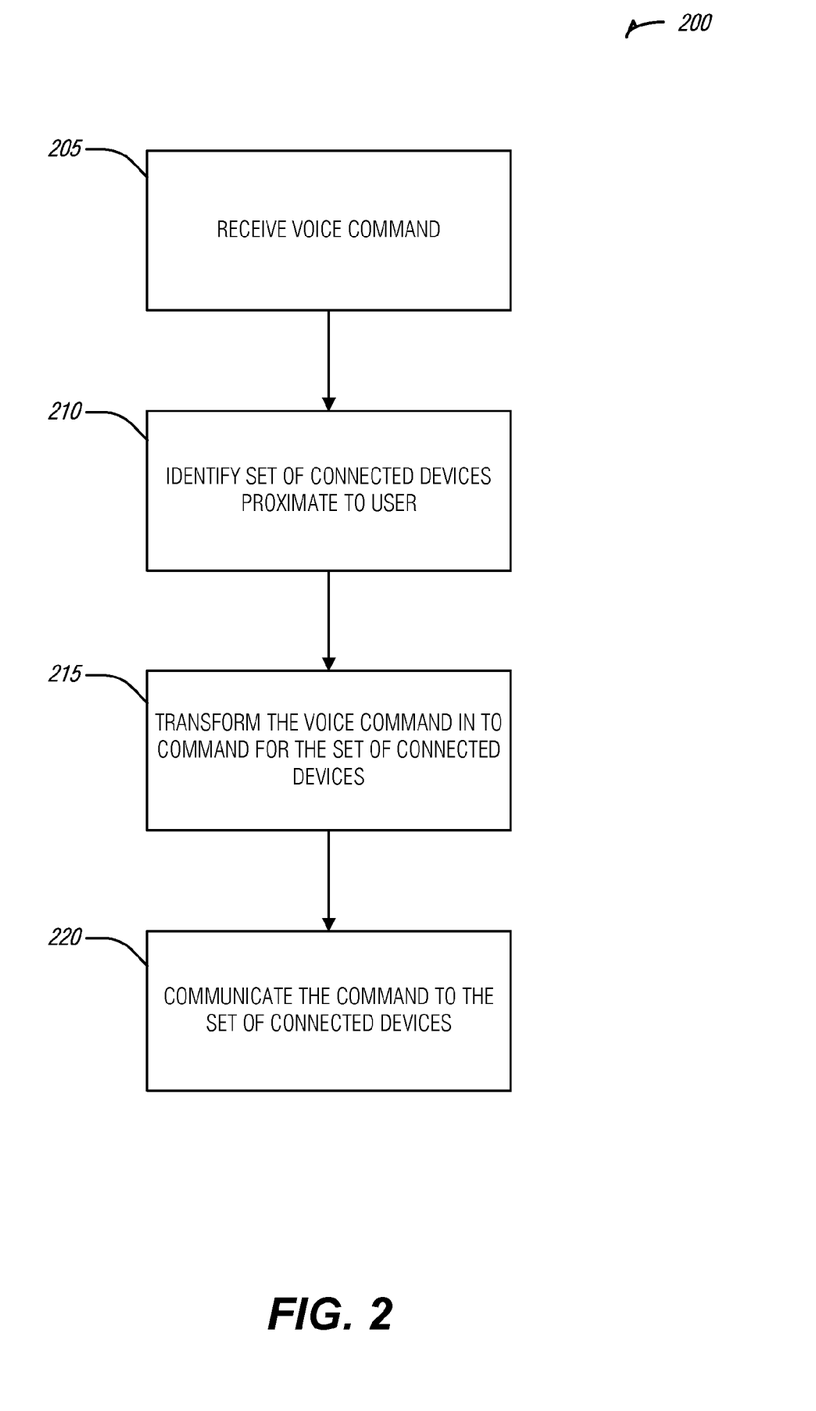
FIG. 2 illustrates an example of a method for connected device voice command support, according to an embodiment.

FIG. 2 illustrates an example of a method 200 for connected device voice command support, according to an embodiment. Operations of the method 200 are carried out by computer hardware, such as the components discussed above with respect to FIG. 1, or groups of circuits as described below with respect to FIG. 4.

At operation 205, a voice command may be received from a user. In an example the voice command may include a connected device characterization. In an example, the characterization may be a connected device type. In an example, characterization may be a connected device function.

At operation 210, a set of connected devices proximate to the user may be identified. In an example, identifying the set of connected devices may include requesting connected device information using a close range wireless technique. In an example, identifying the set of connected devices may include obtaining geophysical positioning data on a superset of connected devices and the device, and selecting connected devices from the superset to be members of the set of connected devices for connected devices within a geo-fence, using the obtained positing data of the superset of connected devices, that includes the device. In an example, identifying the set of connected devices may include monitoring for connected device broadcasts. In an example, where the voice command includes a connected device characterization, identifying the set of connected devices may include filtering a superset of connected devices using the connected device characterization.

In an example, identifying the set of connected devices may include receiving a discovery request from the user, broadcasting a discovery message, and receiving device identifications for a group of connected devices in response to the discovery message. In an example, identifying the set of connected devices may include presenting the device identifications for the group of connected devices to the user, and adding members from the group of connected devices to the set of connected devices in response to user selections made in response to the presentation. In an example, the broadcast may be received by a connected device registry, the device identifications may be received from the connected device registry. In an example, the device identifications may be derived from a user defined translation of a device characterization.

At operation 215, the voice command may be transformed into a command for a set of connected devices. In an example, transforming the voice command into the command may include transmitting the voice command to an external device, and receiving the command from the external device. In an example, transforming the voice command into a command for the set of connected devices may include transforming the voice command into a semantic representation of the voice command.

At operation 220, the command may be communicated to the set of connected devices. In an example, communicating the command to the set of connected devices may include transmitting the command to the set of connected devices, receiving responses to the transmission of the command from a subset of the set of connected devices indicating that the command matches a supported command of the subset of connected devices, and responding to the subset of connected devices to carry out the command. In an example, responding to the subset of connected devices may include identifying conflicts between a plurality of the subset of connected devices based on the command. In an example, the conflicts may be presented to the user. In an example, the response to carry out the command may be restricted to a connected device selected by the user in the response to the conflict presentation.

Figure 3:
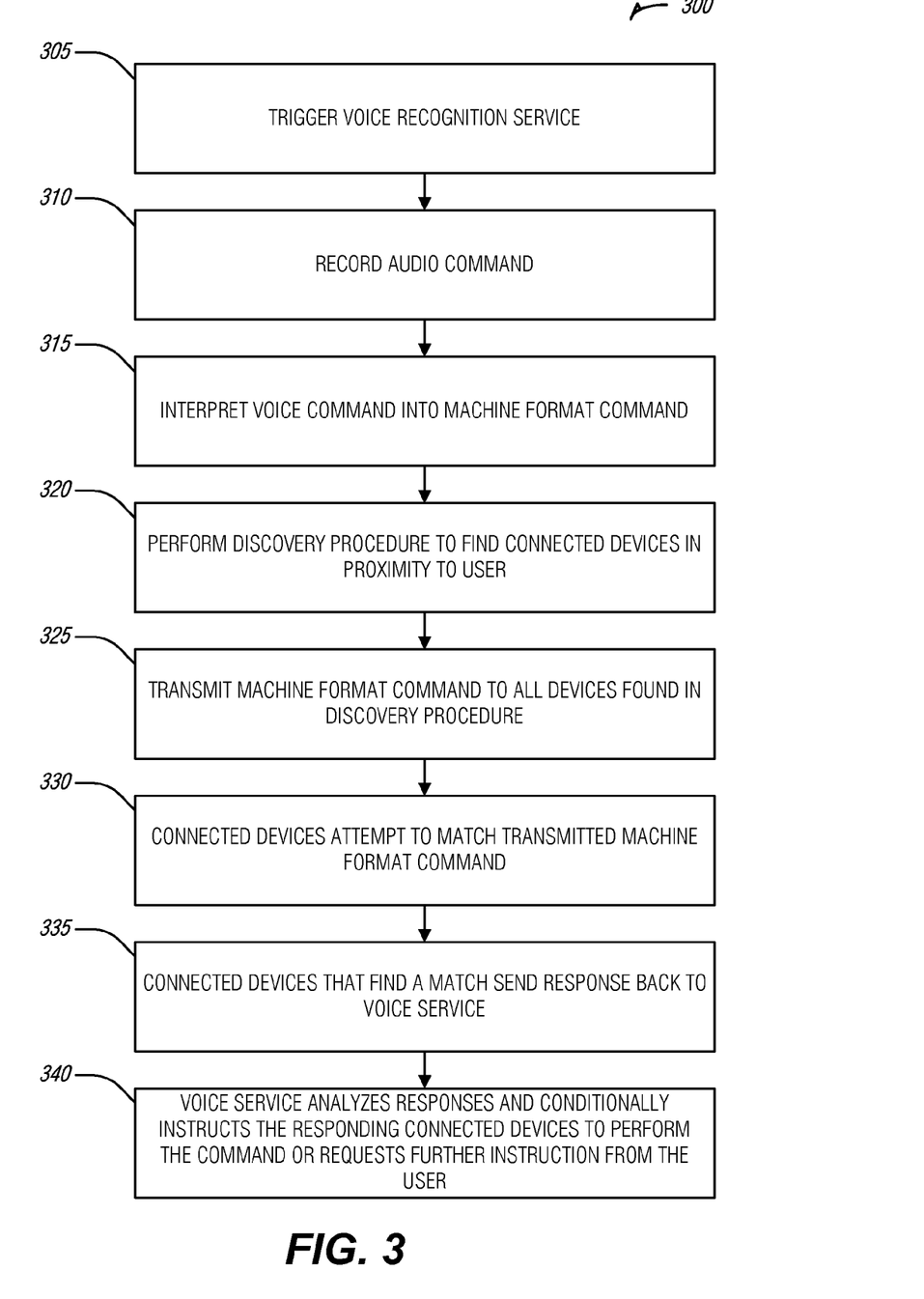
FIG. 3 illustrates an example of a method for connected device voice command support, according to an embodiment.

FIG. 3 illustrates an example of a method 300 for connected device voice command support, according to an embodiment. Operations of the method 300 are carried out by computer hardware, such as the components discussed above with respect to FIG. 1, or groups of circuits as described below with respect to FIG. 4

At operation 305, the voice recognition service (e.g., in a user device) is triggered.

At operation 310, the user device may record the audio command. In an example, the command may be preceded by a name for the connected device (or group of devices) that the user wants to address. In this example, the connected device name may have been given to the user in response to the user issuing a voice command to discover the names of available (e.g., nearby) connected devices. In an example, the connected devices may respond with their names. The user may have been presented with a visual, audible, or other list of these names. In an example, the device query mechanism may also include a query for available functions of the connected devices. In an example, the connected device names, or functions, may be characterized by the user and the user may refer to either via these characterizations. For example two manufacturers may name their respective radios differently, and may also label their volume commands differently (e.g., "turn it up" vs. "louder," etc.). The user may define a characterization for both radios as "radio" and characterize the volume increase command as "make it louder." These characterizations may be accepted by the user device in the voice command and then translated to the specific commands for each of the radios.

At operation 315, the voice recognition service may interpret the command and reformat the command into a machine format (e.g., a binary code, conforming character string, etc.) used or understandable to a connected device. In an example, the voice command may be semantically interpreted, allowing for the voice command to be less protocol-bound. Thus, the semantically interpreted voice command may provide an interim protocol that may be transformed more easily into the format required for the end devices. In an example, this operation could involve interacting with a device registry (e.g., domain hub containing domain specific translation tables). In an example, a sensor may also have its own separate translation table.

At operation 320, the user device may perform a discovery procedure to find the connected devices in proximity to the user. In an example, the discovery procedure may be carried out using a short range radio available on the user device, such as Bluetooth®, WiFi®, RFID, NFC, or other close range wireless techniques. In an example, known device discovery protocols supported by the user device may be used in the discovery operation. In an example where the radio technology is not limited to a reasonably close proximity (e.g., a cellular radio) then the discovery protocol may use geo-position information of the user device together with geo-fence information, (e.g., the radius of a circle around the user device position) and limit available devices (e.g., ignore other devices or instruct devices not to respond) to those within the geo-fence. In an example, as opposed to an active discovery procedure, the user device may listen for connected device broadcast to compile a list of discovered connected devices. In an example, the discovery procedure may contact a connected device registry (e.g., a hub node that includes information about other connected devices) to retrieve connected device identifications or command sets.

At operation 325, the user device may transmit the command to all the devices found in the discovery procedure of operation 320. In an example, prior to sending the command, the user device may compare the command against known command sets of discovered connected devices and refrain from sending the command where the command is not within a command set of a connected device.

At operation 330, the connected devices may try to match the received command with their own command sets (e.g., to determine whether the command applies to them). In an example, if the received command data contains a device name followed by a command, then the matching of the device name may be matched (e.g., succeed) before making an attempt to match the command.

At operation 335, the connected devices finding a match may send a response to the user device.

At operation 340, the user device may the responses. If the user device received no responses, it may notify the user that no devices will handle the command. If the user device receives one response, it may request the responding connected device to carry out the command. If multiple responses are received by the user device, it may resolve which connected devices are to carry out the command. For example, the user device may notify the user and seek identification of which device, if any, should carry out the command. In another example, the user device may determine that any of the responding connected devices may carry out the command based on a common function or type. For example, if several thermostats respond to a command to increase the temperature, the user device may instruct every thermostat to perform the command. In an example, the user may use a multiple-device signal in the voice command to indicate that it is acceptable if multiple devices carry out the command, and thus provide preemptive conflict resolution information to the user device. In an example, the user may be notified that multiple devices will carry out the voice command.

The following is an example of the method 300 in operation for a user who enters a living room and seeks to activate the room lighting. User triggers the voice-to-text service in his mobile device (done e. g. by a specific voice command, such as "Sesame listen", or by opening an app for this service, etc.). In an example, the user may get information about all proximate connected device nodes by saying similar to "Get node IDs," or restrict the query to lighting relevant connected device nodes by saying something similar to "Get lighting node IDs." From the returned connected device node names (which may include attribute data indicating of lighting related nodes) the user may select the name of what he thinks is the name of the desired lighting node and say "<light node name> on". In an example, "common" (e.g., based on an industry standard or convention) node naming conventions. For example, a node controlling lighting can be referenced by the name "light", in which case the user may just say "Light on."

Once the voice command is received it may be translated into another form to be used by a connected device. The alternate form may include a set of commands with members specific to each of the available connected devices. In an example, the translation may be to an intermediate form to both ease the translation to current connected devices, but also to future devices. For example, if the command was interpreted to be a request to get information about all proximate connected device nodes, then communication message(s) initiating discovery of these nodes may be created. This may be handled differently depending on the extent of support for different connected devices protocols available in the user device. For example, if the device supports Constraints RESTful Environment/Constraints Application Protocol (CoRE/CoAP), then the "/.well known!" User Resource Identifier (URI) format specified by this standard may be used. With support for listening for Bluetooth® Low Energy (BLE) beacons, scanning for broadcasts on this bearer, followed by meta-data retrievals on the broadcasted URIs may be used.

In an example, the alternate form may include a semantic definition of the words or phrases in the voice command. Such a semantic definition may provide a convenient middle position to translate the voice command to and also define connected device commands sets from. In an example, the semantic definition may be used to facilitate communication with the user. For example, if a class of sensors reports data in a variety of formats, the meaning of these reports may be reduced to a common form before being reported to the user to avoid confusion.

Figure 4:
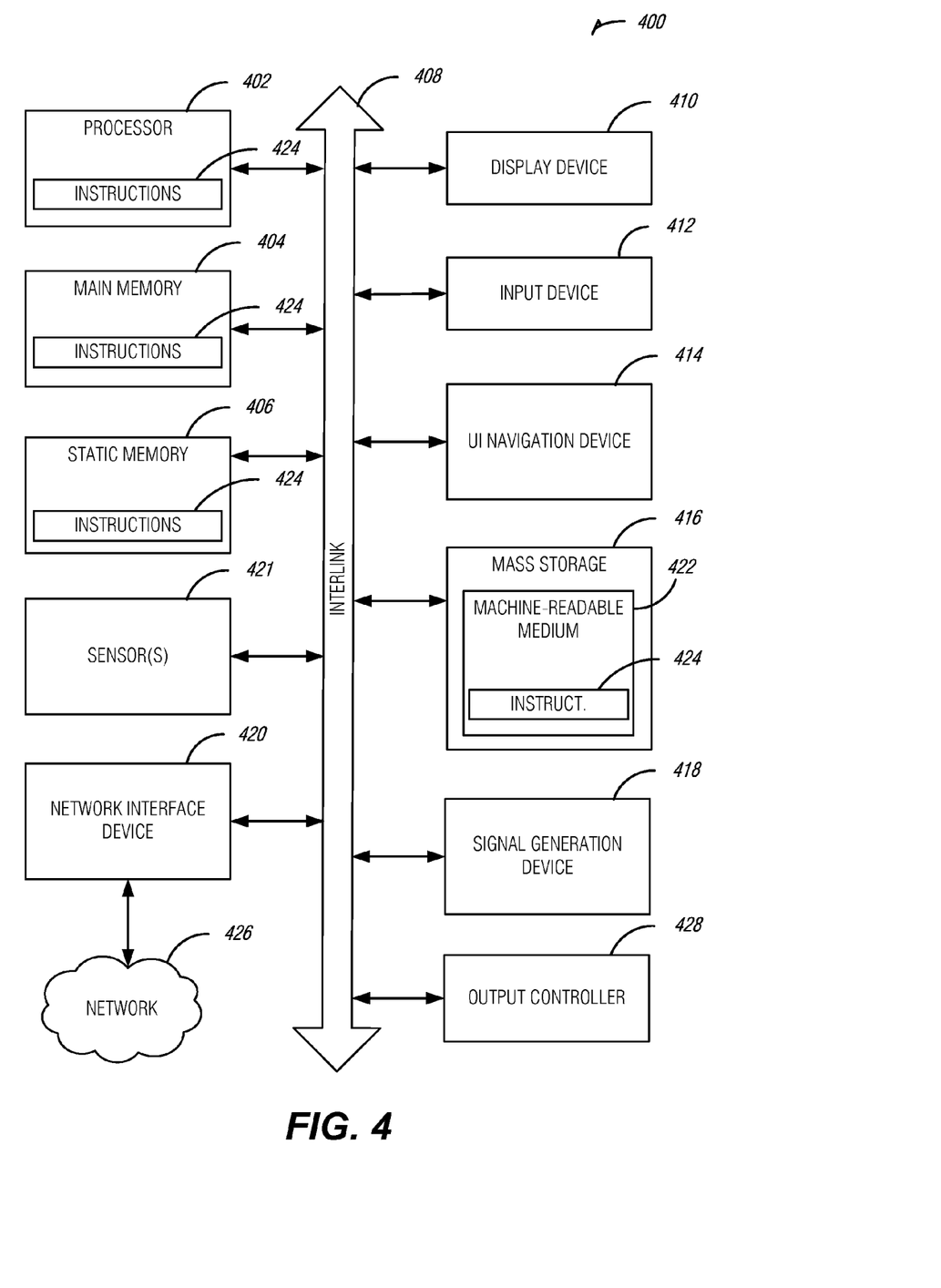
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets (also known as a group of circuits or circuit groups) are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), NFC, etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples

Example 1 may include subject matter (such as a system, apparatus, or device for connected device voice command support) comprising: a microphone to receive a voice command from a user; a device discovery circuit set to identify a set of connected devices proximate to the user; a speech converter to transform the voice command into a command for the set of connected devices; and a transceiver to communicate the command to the set of connected devices.

In Example 2 the subject matter of Example, 1 may optionally include, wherein to identify the set of connected devices includes the device discovery circuit set to request connected device information using a near field wireless technique.

In Example 3 the subject matter of any of Examples 1-2 may optionally include, wherein to identify the set of connected devices include the device discovery circuit set to: obtain geophysical positioning data on a superset of connected devices and the device; and select connected devices from the superset to be members of the set of connected devices for connected devices within a geo-fence, using the obtained positing data of the superset of connected devices, that includes the device.

In Example 4 the subject matter of any of Examples 1-3 may optionally include, wherein to identify the set of connected devices includes the device discovery circuit set to: receive a discovery request from the user; broadcast a discovery message; and receive device identifications for a group of connected devices in response to the discovery message;

In Example 5 the subject matter of Example, 4 may optionally include, wherein to identify the set of connected devices includes the device discovery circuit set to: present the device identifications for the group of connected devices to the user; and add members from the group of connected devices to the set of connected devices in response to user selections made in response to the presentation.

In Example 6 the subject matter of any of Examples 4-5 may optionally include, wherein the broadcast is received by a connected device registry, and wherein the device identifications are received from the connected device registry.

In Example 7 the subject matter of any of Examples 4-6 may optionally include, wherein the device identifications are derived from a user defined translation of a device characterization.

In Example 8 the subject matter of any of Examples 1-7 may optionally include, wherein to identify the set of connected devices includes the device discovery circuit set to monitor for connected device broadcasts.

In Example 9 the subject matter of any of Examples 1-8 may optionally include, wherein the voice command includes a connected device characterization, and wherein to identify the set of connected devices includes the device discovery circuit set to: filter a superset of connected devices using the connected device characterization.

In Example 10 the subject matter of Example 9 may optionally include, wherein the characterization is a connected device type.

In Example 11 the subject matter of any of Examples 9-10 may optionally include, wherein the characterization is a connected device function.

In Example 12 the subject matter of any of Examples 1-11 may optionally include, wherein to transform the voice command into the command includes the speech converter to: transmit the voice command to an external device; and receive the command from the external device.

In Example 13 the subject matter of any of Examples 1-12 may optionally include, wherein to transform the voice command into a command for the set of connected devices includes the speech converter to transform the voice command into a semantic representation of the voice command.

In Example 14 the subject matter of any of Examples 1-13 may optionally include, wherein to communicate the command to the set of connected devices includes the transceiver to: transmit the command to the set of connected devices; receive responses to the transmission of the command from a subset of the set of connected devices indicating that the command matches a supported command of the subset of connected devices; and respond to the subset of connected devices to carry out the command.

In Example 15 the subject matter of Example 14 may optionally include, wherein to respond to the subset of connected devices includes the transceiver to: identify conflicts between a plurality of the subset of connected devices based on the command; present the conflicts to the user; and restrict the response to carry out the command to a connected device selected by the user in response to the presentation of the conflicts.

Example 16 may include, or may optionally be combined with the subject matter of any of Examples 1-15 to include, subject matter (such as a method, means, or computer readable medium including instructions that, when executed by a machine, cause the machine to perform acts) comprising: receiving a voice command from a user; identifying a set of connected devices proximate to the user; transforming the voice command into a command for the set of connected devices; and communicating the command to the set of connected devices.

In Example 17 the subject matter of Example 16 may optionally include, wherein identifying the set of connected devices includes requesting connected device information using a near field wireless technique.

In Example 18 the subject matter of any of Examples 16-17 may optionally include, wherein identifying the set of connected devices includes: obtaining geophysical positioning data on a superset of connected devices and the device; and selecting connected devices from the superset to be members of the set of connected devices for connected devices within a geo-fence, using the obtained positing data of the superset of connected devices, that includes the device.

In Example 19 the subject matter of any of Examples 16-18 may optionally include, wherein identifying the set of connected devices the device discovery circuit set includes: receiving a discovery request from the user; broadcasting a discovery message; and receiving device identifications for a group of connected devices in response to the discovery message;

In Example 20 the subject matter of Example 19 may optionally include, wherein identifying the set of connected devices includes the device discovery circuit set: presenting the device identifications for the group of connected devices to the user; and adding members from the group of connected devices to the set of connected devices in response to user selections made in response to the presentation.

In Example 21 the subject matter of any of Examples 19-20 may optionally include, wherein the broadcast is received by a connected device registry, and wherein the device identifications are received from the connected device registry.

In Example 22 the subject matter of any of Examples 19-21 may optionally include, wherein the device identifications are derived from a user defined translation of a device characterization.

In Example 23 the subject matter of any of Examples 16-22, wherein identifying the set of connected devices includes the device discovery circuit set monitoring for connected device broadcasts.

In Example 24 the subject matter of any of Examples 16-23 may optionally include, wherein the voice command includes a connected device characterization, and wherein identifying the set of connected devices includes filtering the device discovery circuit seta superset of connected devices using the connected device characterization.

In Example 25 the subject matter of Example 24 may optionally include, wherein the characterization is a connected device type.

In Example 26 the subject matter of any of Examples 24-25 may optionally include, wherein the characterization is a connected device function.

In Example 27 the subject matter of any of Examples 16-26 may optionally include, wherein transforming the voice command into the command includes: transmitting the voice command to an external device; and receiving the command from the external device.

In Example 28 the subject matter of any of Examples 16-27 may optionally include, wherein transforming the voice command into a command for the set of connected devices includes transforming the voice command into a semantic representation of the voice command.

In Example 29 the subject matter of any of Examples 16-28 may optionally include, wherein communicating the command to the set of connected devices includes: transmitting the command to the set of connected devices; receiving responses to the transmission of the command from a subset of the set of connected devices indicating that the command matches a supported command of the subset of connected devices; and responding to the subset of connected devices to carry out the command.

In Example 30 the subject matter of Example 29 may optionally include, wherein responding to the subset of connected devices includes: identifying conflicts between a plurality of the subset of connected devices based on the command; presenting the conflicts to the user; and restricting the response to carry out the command to a connected device selected by the user in response to the presentation of the conflicts.

Example 31 may include, or may optionally be combined with the subject matter of any of Examples 1-31 to include, subject matter for connected device voice command support comprising: means for receiving a voice command from a user; means for identifying a set of connected devices proximate to the user; means for transforming the voice command into a command for the set of connected devices; and means for communicating the command to the set of connected devices.

In Example 32 the subject matter of Example 31 may optionally include, wherein identifying the set of connected devices includes requesting connected device information using a near field wireless technique.

In Example 33 the subject matter of any of Examples 31-32 may optionally include, wherein identifying the set of connected devices includes: obtaining geophysical positioning data on a superset of connected devices and the device; and selecting connected devices from the superset to be members of the set of connected devices for connected devices within a geo-fence, using the obtained positing data of the superset of connected devices, that includes the device.

In Example 34 the subject matter of any of Examples 31-33 may optionally include, wherein identifying the set of connected devices the device discovery circuit set includes: receiving a discovery request from the user; broadcasting a discovery message; and receiving device identifications for a group of connected devices in response to the discovery message.

In Example 35 the subject matter of Example, 34 may optionally include, wherein identifying the set of connected devices includes the device discovery circuit set: presenting the device identifications for the group of connected devices to the user; and adding members from the group of connected devices to the set of connected devices in response to user selections made in response to the presentation.

In Example 36 the subject matter of any of Examples 34-35 may optionally include, wherein the broadcast is received by a connected device registry, and wherein the device identifications are received from the connected device registry.

In Example 37 the subject matter of any of Examples 34-36 may optionally include, wherein the device identifications are derived from a user defined translation of a device characterization.

In Example 38 the subject matter of any of Examples 31-37 may optionally include, wherein identifying the set of connected devices includes the device discovery circuit set monitoring for connected device broadcasts.

In Example 39 the subject matter of any of Examples 31-38 may optionally include, wherein the voice command includes a connected device characterization, and wherein identifying the set of connected devices includes filtering the device discovery circuit seta superset of connected devices using the connected device characterization.

In Example 40 the subject matter of Example 39 may optionally include, wherein the characterization is a connected device type.

In Example 41 the subject matter of any of Examples 39-40 may optionally include, wherein the characterization is a connected device function.

In Example 42 the subject matter of any of Examples 31-41 may optionally include, wherein transforming the voice command into the command includes: transmitting the voice command to an external device; and receiving the command from the external device.

In Example 43 the subject matter of any of Examples 31-43 may optionally include, wherein transforming the voice command into a command for the set of connected devices includes transforming the voice command into a semantic representation of the voice command.

In Example 44 the subject matter of any of Examples 31-43 may optionally include, wherein communicating the command to the set of connected devices includes: transmitting the command to the set of connected devices; receiving responses to the transmission of the command from a subset of the set of connected devices indicating that the command matches a supported command of the subset of connected devices; and responding to the subset of connected devices to carry out the command.

In Example 45 the subject matter of Example, 44 may optionally include, wherein responding to the subset of connected devices includes: identifying conflicts between a plurality of the subset of connected devices based on the command; presenting the conflicts to the user; and restricting the response to carry out the command to a connected device selected by the user in response to the presentation of the conflicts.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for connected device voice command support, the device comprising:
   a microphone to receive a voice command from a user;
   a device discovery circuit set to identify a set of connected devices proximate to the user;
   a speech converter to:
      transform the voice command into a semantic representation of the voice command; and
      translate the semantic representation of the voice command into a command for the set of connected devices; and
   a transceiver to communicate the command to the set of connected devices including the transceiver to:
      transmit the command to the set of connected devices;
      receive responses to the transmission of the command from a subset of the set of connected devices, the responses indicating that the command matches a supported command of members of the subset of connected devices;
      identify conflicts between a plurality of the subset of connected devices based on the command
      present the existence of the conflicts to the user via a haptic output;
      observe a physical response of the user to select a connected device from the plurality of the subset of connected devices, the physical response being at least one of waving a hand or looking at the connected device; and
      respond to the subset of connected devices to carry out the command by a reissue of the command transmitted to the set of connected devices again to the connected device, the reissue of the command being restricted to the connected device by the physical response of the user in response to the presentation of the conflicts.

2. The device of claim 1, wherein to identify the set of connected devices includes the device discovery circuit set to:
   receive a discovery request from the user;
   broadcast a discovery message; and
   receive device identifications for a group of connected devices in response to the discovery message.

3. The device of claim 2, wherein to identify the set of connected devices includes the device discovery circuit set to:
   present the device identifications for the group of connected devices to the user; and
   add members from the group of connected devices to the set of connected devices in response to user selections made in response to the presentation.

4. The device of claim 2, wherein the broadcast is received by a connected device registry, and wherein the device identifications are received from the connected device registry.

5. The device of claim 2, wherein the device identifications are derived from a user defined translation of a device characterization.

6. The device of claim 1, wherein the voice command includes a connected device characterization, and wherein to identify the set of connected devices includes the device discovery circuit set to:
filter a superset of connected devices using the connected device characterization.

7. A method for connected device voice command support, the method comprising:
receiving a voice command from a user;
identifying a set of connected devices proximate to the user;
transforming the voice command into a semantic representation of the voice command translating the semantic representation of the voice command into a command for the set of connected devices; and
communicating the command to the set of connected devices, the communicating including:
transmitting the command to the set of connected devices;
receiving responses to the transmission of the command from a subset of the set of connected devices, the responses indicating that the command matches a supported command of members of the subset of connected devices;
identifying conflicts between a plurality of the subset of connected devices based on the command;
presenting the existence of the conflicts to the user via a haptic output;
observing a physical response of the user to select a connected device from the plurality of the subset of connected devices, the physical response being at least one of waving a hand or looking at the connected device; and
responding to the subset of connected devices to carry out the command by reissuing the command transmitted to the set of connected devices again to the connected device, the reissuing of the command being restricted to the connected device by the physical response of the user in response to the presentation of the conflicts.

8. The method of claim 7, wherein identifying the set of connected devices includes:
receiving a discovery request from the user;
broadcasting a discovery message; and
receiving device identifications for a group of connected devices in response to the discovery message.

9. The method of claim 8, wherein identifying the set of connected devices includes:
presenting the device identifications for the group of connected devices to the user; and
adding members from the group of connected devices to the set of connected devices in response to user selections made in response to the presentation.

10. The method of claim 8, wherein the broadcast is received by a connected device registry, and wherein the device identifications are received from the connected device registry.

11. The method of claim 8, wherein the device identifications are derived from a user defined translation of a device characterization.

12. The method of claim 7, wherein the voice command includes a connected device characterization, and wherein identifying the set of connected devices includes filtering a superset of connected devices using the connected device characterization.

13. At least one non-transitory machine readable medium including instructions that, when executed by a machine, cause the machine to perform operations for connected device voice command support, the operations comprising:
receiving a voice command from a user;
identifying a set of connected devices proximate to the user;
transforming the voice command into a semantic representation of the voice command translating the semantic representation of the voice command into a command for the set of connected devices; and
communicating the command to the set of connected devices, the communicating including:
transmitting the command to the set of connected devices;
receiving responses to the transmission of the command from a subset of the set of connected devices, the responses indicating that the command matches a supported command of members of the subset of connected devices;
identifying conflicts between a plurality of the subset of connected devices based on the command;
presenting the existence of the conflicts to the user via a haptic output;
observing a physical response of the user to select a connected device from the plurality of the subset of connected devices, the physical response being at least one of waving a hand or looking at the connected device; and
responding to the subset of connected devices to carry out the command by reissuing the command transmitted to the set of connected devices again to the connected device, the reissuing of the command being restricted to the connected device by the physical response of the user in response to the presentation of the conflicts.

14. The at least one machine readable medium of claim 13, wherein identifying the set of connected devices includes:
receiving a discovery request from the user;
broadcasting a discovery message; and
receiving device identifications for a group of connected devices in response to the discovery message.

15. The at least one machine readable medium of claim 14, wherein identifying the set of connected devices includes:
presenting the device identifications for the group of connected devices to the user; and
adding members from the group of connected devices to the set of connected devices in response to user selections made in response to the presentation.

16. The at least one machine readable medium of claim 14, wherein the broadcast is received by a connected device registry, and wherein the device identifications are received from the connected device registry.

17. The at least one machine readable medium of claim 14, wherein the device identifications are derived from a user defined translation of a device characterization.

18. The at least one machine readable medium of claim 13, wherein the voice command includes a connected device characterization, and wherein identifying the set of connected devices includes filtering a superset of connected devices using the connected device characterization.

* * * * *

UNITED STATES PATENT AND TRADEMARK OFFICE
CERTIFICATE OF CORRECTION

PATENT NO.         : 9,811,312 B2
APPLICATION NO.    : 14/579142
DATED              : November 7, 2017
INVENTOR(S)        : Ulf Bjorkengren It is certified that error appears in the above-identified patent and that said Letters Patent is hereby corrected as shown below:

In the Claims

In Column 16, Line 38, in Claim 1, delete "command" and insert --command;-- therefor Signed and Sealed this
Eleventh Day of June, 2019

Andrei Iancu
*Director of the United States Patent and Trademark Office*